(12) United States Patent  (10) Patent No.: US 8,641,871 B2
Grispin  (45) Date of Patent: *Feb. 4, 2014

(54) PYROLYTIC PROCESS AND APPARATUS FOR PRODUCING ENHANCED AMOUNTS OF AROMATIC COMPOUNDS

(75) Inventor: Charles W. Grispin, Akron, OH (US)

(73) Assignee: RES Polyflow LLC, Akron, OH (US)

( * ) Notice: Subject to any disclaimer, the term of this patent is extended or adjusted under 35 U.S.C. 154(b) by 335 days.

This patent is subject to a terminal disclaimer.

(21) Appl. No.: 13/013,809

(22) Filed: Jan. 25, 2011

(65) Prior Publication Data

US 2011/0114467 A1    May 19, 2011

Related U.S. Application Data

(63) Continuation of application No. 11/664,647, filed as application No. PCT/US2004/033796 on Oct. 13, 2004, now Pat. No. 7,883,605.

(51) Int. Cl.
 *C10B 57/04*  (2006.01)
 *C07C 1/00*  (2006.01)

(52) U.S. Cl.
 USPC ............... 201/25; 201/30; 201/40; 201/42; 585/241

(58) Field of Classification Search
 USPC ............... 585/241; 201/25, 30, 40, 42
 See application file for complete search history.

(56) References Cited

U.S. PATENT DOCUMENTS 7,883,605 B2 * 2/2011 Grispin ............... 201/25
8,137,508 B2 * 3/2012 Grispin ............... 201/25

FOREIGN PATENT DOCUMENTS

EP    0162 802    * 11/1985

* cited by examiner

*Primary Examiner* — Nina Bhat
(74) *Attorney, Agent, or Firm* — Eileen T. Mathews

(57) ABSTRACT

Processes for pyrolyzing hydrocarbonaceous material are provided. A process for pyrolyzing hydrocarbonaceous material includes charging a reactor with a feed material comprising hydrocarbonaceous material, heating the feed material, and collecting liquid product from the reactor which is anaerobic in operation. At least 5% of the organic carbon atoms which are not present in an aromatic ring of a compound of the feed material are present in an aromatic ring of a compound in a liquid portion of the product.

21 Claims, 1 Drawing Sheet

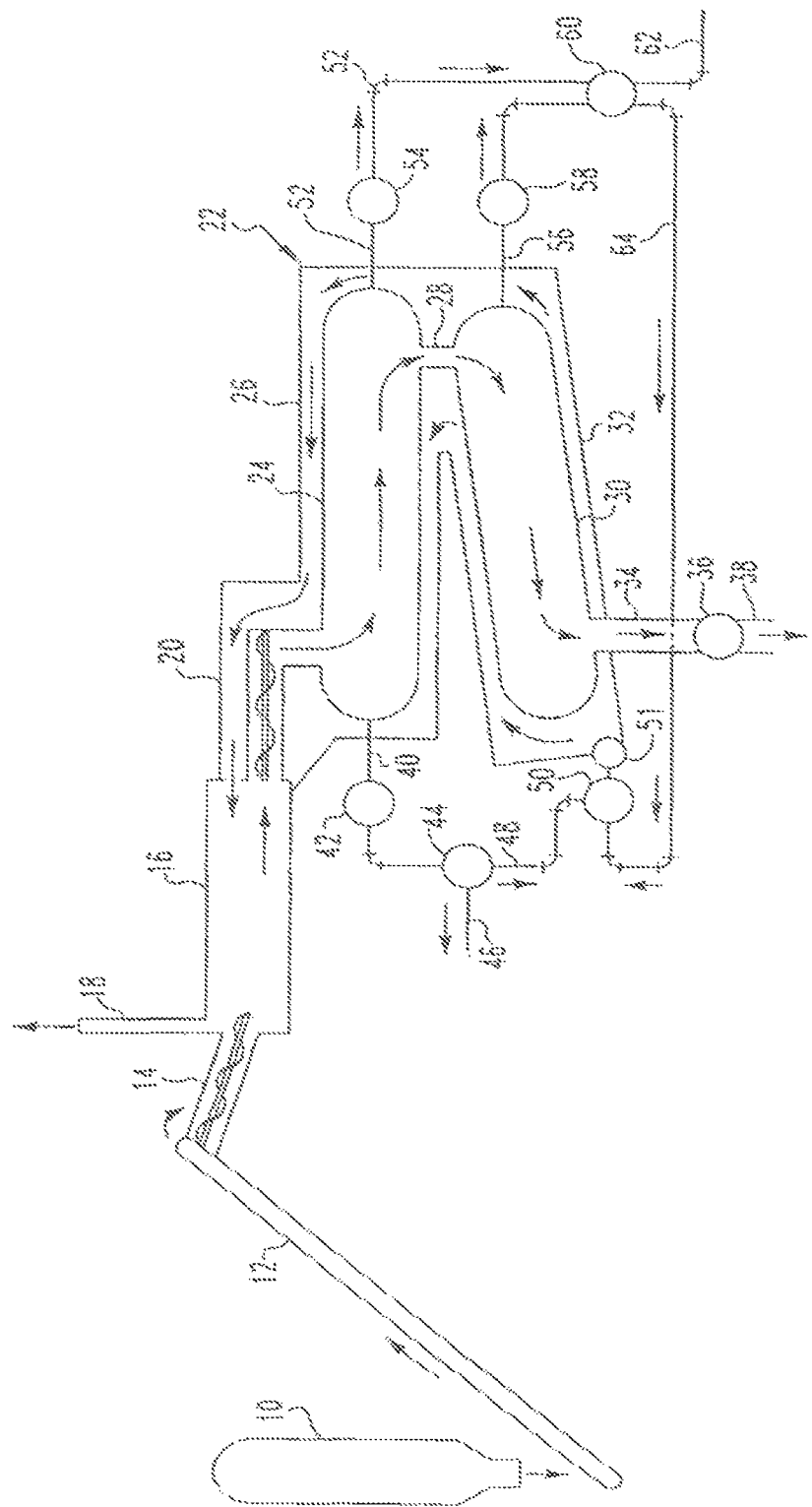

PYROLYTIC PROCESS AND APPARATUS FOR PRODUCING ENHANCED AMOUNTS OF AROMATIC COMPOUNDS

CROSS REFERENCE TO RELATED APPLICATIONS

The present application is a Continuation of U.S. patent application Ser. No. 11/664,647, entitled "Pyrolytic Process and Apparatus For Producing Enhanced Amounts of Aromatic Compounds" filed Sep. 11, 2007 is now U.S. Pat. 7,883, 605, which is a U.S. National Stage Application of PCT/US04/33796 entitled "Pyrolytic Process and Apparatus For Producing Enhanced Amounts of Aromatic Compounds" filed Oct. 13, 2004.

BACKGROUND

Pyrolytic processes are known in which waste polymer present in scrap, for example, thermoplastic components, tires, etc., are heated to produce products such as liquid oils, gases, and carbon black. However, there is difficultly in achieving commercial viability for such processes when the yield in recovering aromatic hydrocarbons is low, for example, such that the cost of recovering products is more costly than the cost associated with deriving these materials directly from petroleum.

U.K. Patent No. 1,481,352 discloses a method of thermal decomposition of hydrocarbons by at least partially indirectly contacting the hydrocarbons with a hot gas. The gas is let off after heat exchange separately from the gaseous products formed in the decomposition. Tires are heated in a tube by hot gases flowing through the jacket around the tube. In another embodiment the tube has a grid region to which a combustion gas is fed to aid carbonization by direct gas heating at the grid carbon interface. Steam or $CO_2$ may be fed to the grid to form water gas or reduce gas to aid combustion.

U.S. Bureau of Mines report of investigation #7302 discloses a method of destructive distillation of scrap tires. A report was made of tests conducted under a variety of conditions. Solid, liquid, and gaseous were produced, recovered and analyzed. The quantities of various products were shown to be dependent on test temperature variability in composition of the liquid and gaseous products which changes in temperature was also reported.

U.S. Pat. No. 4,746,406 to Timmann discloses a process for the pyrolytic reprocessing of plastic, rubber, or other hydrocarbon materials in which the resultant pyrolysis gas is brought in a cooling stage to a temperature just above the freezing point of water and to a pressure of approximately 0.8 to 1.4 bar of overpressure. The resultant condensate is then separated and heated to a normal storage temperature and the super atmospheric pressure on the condensate reduced to atmospheric pressure. The gas produced thereby comprising C1 to C4 hydrocarbon compounds is supplied to the pyrolysis process as special product gas. A substantial increase in the proportion of aromatic compounds in the pyrolysis gas is reported.

Although the pyrolytic processes of the prior art can generate reusable products, the resulting yield of useful products can render the process economically unfeasible. The cost of these processes is increased even further when the feed material must be sorted based upon its material composition.

SUMMARY

The example embodiments of the present invention provide for processes for pyrolyzing hydrocarbonaceous material to yield liquid product containing an enhanced amount of aromatic compounds. In one embodiment the process for pyrolzing hydrocarbonaceous material includes charging a reactor with feed material comprising hydrocarbonaceous material, heating the feed material, collecting product from the reactor which is anaerobic in operation. At least 5% of the organic carbon atoms which are not present in an aromatic ring of a compound of the feed material are present in an aromatic ring of a compound in a liquid portion of the product.

In another embodiment a process for pyrolyzing hydrocarbonaceous material includes charging a reactor having a volume of at least 1.7 cubic meters with feed material that comprises carbonaceous material, heating the feed material at an initial heat flux rate that ranges from about $7 \times 10^{-4}$ kW·m$^2$/kg$^2$ to about 3.0 kW·m$^2$/kg$^2$ and collecting liquid product from the reactor which is anaerobic in operation.

An embodiment of the invention also provides for a reactor apparatus for the pyrolysis of hydrocarbonaceous material, the reactor apparatus includes an upper stage comprising an inclined upper inner wall vessel having an upper material input port and a lower material output, an upper outer wall vessel having an upper gas output port and lower gas input port and surrounding the inner wall vessel such that a gas conveying space is interposed between the inner wall vessel and the outer wall vessel; a lower stage comprising an inclined lower inner wall vessel having an upper material input port connected to the lower material output port of the upper inner wall vessel and a lower material output port; a lower outer wall vessel having an upper gas output port and connected to the lower gas input port of the upper outer walled vessel, and surrounding the inner walled vessel such that a gas conveying space is interposed between said inner walled vessel and said outer walled vessel; and a heater positioned in the lower stage. The reactor apparatus can include multiple repeating units of the above-mentioned upper and lower units in a cascading or staircase-type reactor arrangement. The heater can be located in alternative positions of the reactor, for example, another heater can be added to one or more of the intermediate repeating units.

BRIEF DESCRIPTION OF THE DRAWING

Example embodiments of the present invention can be understood with reference to the following drawing. The components in the drawings are not necessarily to scale.

FIG. 1 is a schematic of multistage continuous reactor apparatus, according to an embodiment of the invention.

DETAILED DESCRIPTION

The embodiments of the present invention include processes and systems for pyrolysis of hydrocarbonaceous material found in waste, for example, thermoplastic polymers, theremoset polymers, and blends thereof, such that they are converted into useful products yielding enhanced amounts of aromatic compounds.

In one embodiment a process for pyrolysing hydrocarbanaceous material includes charging a reactor with feed material comprising hydrocarbonaceous material, heating the feed material, collecting product from the reactor which is anaerobic in operation. The term "anaerobic" herein means that, upon initial heating, the reactor contains less than about 3% by volume oxygen, in an alternative embodiment, less than about 2% by volume oxygen, in an alternative embodiment, less than about 1% by volume oxygen, and in yet an alternative embodiment, from about 0.01% to about 1% by volume oxygen, based on the internal volume of the reactor. The process results in at least 5%, in an alternative embodiment, from about 10% to about 90%, in an alternative embodiment from about 15% to about 70%, and in yet an alternative embodiment, from about 20% to about 60% of the organic carbon atoms which are not present in an aromatic ring of a compound of the feed material are present in an aromatic ring of a compound in a liquid portion of the product. The term "aromatic ring" is understood by those of ordinary skill in the art as six carbon atoms bonded in a ring, and carbon atoms that are present in an aromatic ring does not include the carbon atoms found in pendant chains and functional groups which are bonded to the aromatic ring. That is, the amount of aromatic rings present in the product is greater than the amount of aromatic rings present in the feed material. The pyrolytic process according to the various embodiments described herein, demonstrate that random mixtures of feed material containing hydrocarbonaceous material produce new aromatic rings.

The conversion of the amount of the organic carbon atoms which are not present in the aromatic rings of compounds of the feed material to the amount of organic carbon atoms found in aromatic rings of compounds of the liquid portion of the product, can depend upon the amount of organic carbon atoms that are not initially present in aromatic rings of the feed material. For example, if the feed material contains organic carbon atoms, 80% of which are not present in an aromatic ring of a compound, then the pyrolysis process will convert at least 4% of those carbon atoms into carbon atoms which are present in the rings of aromatic compounds of the liquid portion of the product. In another example, if the feed material contains organic carbon atoms, 35% of which are not present in an aromatic ring of a compound, then the process will convert at least 1.75% of those organic carbon atoms into carbon atoms found in the rings of aromatic compounds found in the liquid product. The amount of organic carbon atoms which are present in aromatic rings of compounds and those which are not present in aromatic rings of compounds can be measured by the Carbon 13 NMR test which is well known to those of ordinary skill in the art. The feed materials, in the various embodiments described above, contain organic carbon atoms, and at least 20%, in some examples, at least 40%, and yet in other examples, at least 50% of the organic carbon atoms are not present in aromatic rings of the feed material. That is, at least half of the organic carbon atoms present in the feed material are bonded in an arrangement that is different than an aromatic ring bonding arrangement. The feed material can include a random mix of scrap that includes at least about 70% by weight, alternatively, at least about 80%, and yet alternatively, at least about 90% hydrocarbonaceous material, wherein the hydrocarbonaceous material includes at least two distinct compositions. In another embodiment the feed material can also include up to about 25% by weight metal. The metal increases heat conduction throughout the pyrozylate mass which increases the effective heating rate which reduces the time required to achieve exhaustive pyrolysis.

Hydrocarbonaceous materials can include thermoplastic polymers such as, for example, polyethylene, polypropylene, polyester, acrylonitrile-butadiene-styrene (ABS) copolymers, polyamide, polyurethane, polyethers, polycarbonates, poly(oxides), poly(sulfides), polyarylates, polyetherketones, polyetherimides, polysulfones, polyurethanes, polyvinyl alcohols, and polymers produced by polymerization of monomers, such as, for example, dienes, olefins, styrenes, acrylates, acrylonitrile, methacrylates, methacrylonitrile, diacids and diols, lactones, diacids and diamines, lactams, vinyl halides, vinyl esters, block copolymers thereof, and alloys thereof. Polymers yielding halogenated material upon pyrolysis, for example, polyvinyl chloride, polytetrafluoroethylene, and other halogenated polymers, can be corrosive but can be tolerated.

Hydrocarbonaceous materials can also include thermoset polymers such as, for example, epoxy resins; phenolic resins; melamine resins; alkyd resins; vinyl ester resins; unsaturated polyester resins; crosslinked polyurethanes; polyisocyanurates; crosslinked elastomers, including but not limited to, polyisoprene, polybutadiene, styrene-butadiene, styrene-isoprene, ethylene-propylene-diene monomer polymer; and blends thereof.

Hydrocarbonaceous material found in scrap material can have a combination of thermoplastic and thermoset polymers, for example, tires, paint, adhesive, automotive shredder waste (fluff), etc., and can be used as feed material according to the various embodiments of the pyrolytic process herein. Other hydrocarbonaceous materials which can be utilized are believed to include coal, shale oil and tar sands. Carbohydrates may be present in small amounts; however, they are not preferred materials as the major portion of the hydrocarbonaceous material. In general, carbon and hydrogen atoms comprise at least 55 weight percent of the total hydrocarbonaceous material, in some cases, at least 65 weight percent, and alternatively, at least 70 weight percent of the total hydrocarbonaceous material present in the feed material and charged to the process.

The amount of feed material charged into the reactor is generally high. For example, in one embodiment the feed material can range from about 25 to about 635 Kg/m$^3$ [from about 100 to about 2,500 lb. per 64 foot$^3$], in another embodiment from about 50 to about 500 Kg/m$^3$ [from about 100 to 2,000 lb. per 64 ft$^3$], and in yet an alternative embodiment from about 75 to about 375 kg/m$^3$ [from about 300 to 1,500 lb per 64 foot$^3$]. In a process in which the feed material is agitated, for example, when the reactor size has a diameter of about 2.44 m [8 foot], the amount of feed material per unit volume of reactor can be higher. The amount of feed material charged into the reactor can range as from about 50 to about 750 kg/m$^3$ [200 to about 3,000 lb per 64 ft$^3$], alternatively from about 50 kg to about 625 kg [200 to about 2,500 lb per 64 ft$^3$], and alternatively from about 75 to about 500 kg/m$^3$ [from about 300 to about 2000 lb per 64 ft$^3$]. Generally the optimum amount of feed material charged into the reactor will vary according to the type of charge material and agitation, all of which relate to the effective heating rate of the charge.

The internal volume of the reactor is greater than about 0.0283 cubic meters [1 cubic foot], in an alternative embodiment the internal volume ranges from about 0.0850 cubic meters [3 cubic feet] to about 84.95 cubic meters [3,000 cubic feet], and in yet an alternative embodiment, ranges from about 0.2265 cubic meters [8 cubic feet] to about 56.63 cubic meters [2,000 cubic feet]. Should some sort of an internal mixer be utilized, the internal volume is usually larger as from about 0.0850 m$^3$ to about 113.27 m$^3$ [3 cubic feet to about 4,000 cubic feet] and often from about 0.2832 m$^3$ to about 70.79 m$^3$ [10 to 2500 cubic feet]. Although larger sizes can be utilized, they are generally impractical because of fabrication costs, engineering considerations, heat transfer issues, and the like. Naturally, the rate of agitation and the agitator configuration are parameters that influence optimal reactor design. In general, gentle agitation will produce a pyrolyzate bed having lower turbulence which will reduce the chance of entrainment of carbon particles and/or other bed particulates into the pyrolytic gases and resultant condensate.

Although the reactor shape can vary, a reactor having a high volume to surface area is desirable, for example, in reactor shapes that are cubical, rectangular and spherical. In another example embodiment the reactor is a spheroid or pipe-like. Due to the high heating rates and temperature, the reactor is typically made of a material having a high melting point, for example, steel, stainless steel, or high temperature alloy, for example, Inconel.

The heating temperature applied to the reactor can range from about 426° C. [800° F.] to about 1,371° C. [2,500° F.], in an alternative embodiment, from about 649° C. [1,200° F.] to about 1,260° C. [2,300° F.], an in yet an alternative embodiment from about 815° C. [1,500° F.] to about 1,093° C. [2,000° F.]. The heat source can be any conventional source yielding the above temperatures and can include, for example, natural gas, electric heat, coke, and the like. The heating rate can be constant, variable, and intermittent, for example.

It has been found that the use of low input heat rates into large amounts of feed material, yield products that contain alkylated aromatics which are desirable feed stocks for many commercial applications. The heat input rate per unit mass of feed material can range from about 0.232 mJ/kg/hr [100 BTU/lb/hr] to about 116.2 mJ/kg/hr [50,000 BTU/lb/hr], in another embodiment from about 11.62 mJ/kg/hr [5,000 BTU/lb/hr] or less, in another embodiment, about 4.65 mJ/kg/hr [2,000 BTU/lb/hr] or less, in an alternative embodiment, about 1.16 mJ/kg/hr [500 BTU/lb/hr] or less. It has been observed that low heat input rates along with the formation of a pyrolyzate mass or "pyrozylate bed" yields proportions of products not heretofore achieved. However, if too low a heating rate is used the process may not be of economic interest, because the time to exhaustive pyrolysis is greater than practical.

The average area of loading of the feed material on the heated surface of the reactor upon initial heating can range from about 9.0 kg/m$^2$ to about 400 kg/m$^2$, in an alternative embodiment from about 20 kg/m$^2$ to about 375 kg/m$^2$ and in yet another embodiment, from about 30 kg/m$^2$ to about 250 kg/m$^2$. The bed depth, or thickness of the feed material along the heated surface of the reactor, can be determined by the average area loading of the feed material within the reactor. The average area of loading of the feed material takes into account the variations in the bed depth depending upon the reactor geometry.

In the example embodiments described above, the reactor has sufficient depth to enable formation of a pyrolyzate char layer during pyrolysis and also sufficient head space above the feed material to allow escape of products in the form of a gaseous stream, at least a portion of which is condensable into a liquid portion of the product. The internal volume of the reactor is consumed by the volume of the feed material, the interstitial volume between particles of the feed material, and head volume or "head space" above the feed material (Internal Volume of Reactor=Volume of Feed Material+Interstitial Volume+Head Space). A large head space provides adequate surge volume and reduces the risk of plugging the movement of product through the system. The "free volume" is defined as the sum of the interstitial volume and the head space (Free Volume=Interstitial Volume+Head Space). The free volume increases as the pyrolysis process continues to exhaust the feed material to produce product. Upon initial heating, the interstitial volume normally decreases due to the melting or the collapse of the feed material upon heating. For example, a charge of feed material containing whole tires can collapse upon heating thereby greatly increasing the head space while also decreasing the interstitial volume. The reactor has at least about 25% free volume upon initial heating, in some embodiments at least 40% free volume upon heating, and in alternative embodiment at least about 50% free volume upon heating.

The interstitial volume can depend upon the particle size of the feed material. Bulky scrap material used as feed stock, such as scrapped tires and the like, may be shredded to the form of chunks, pellets, or small particles. This is of advantage for feeding a continuous reactor. The chunky nature of the material forming a pyrolytic bed can also be of advantage in certain situations; e.g., the interstitial volume present in a charge of such chunks permits thermally conduction within the pyroyzlate charge. Melted thermoplastic portions of the charge and well as hot escaping vapors may enhance heat transfer to the chunks, even though chunks have decreased contact area with the reactors heated surfaces. However, in general, reduction of size of particles of feed material smaller than about 5 millimeters has little advantage in the process.

An effective heating rate can be defined as follows:

Effective Heating Rate=[(BTU/hr)/lbs]/Time to Exhaustive Pyrolysis

For example, 1000 lbs of thermoplastic heated at a given rate takes X time to pyrolize. 1000 lbs of thermoset in the same reactor using the same conditions takes much longer than X time to pyrolize. The ranging test of Example 9 described below demonstrated that, thermally conductive material, (i.e. metallic wire,) +thermoset material, can be pyrolized in a time close to X. The decreased time to exhaustive pyrolysis is due to the increase of the effective heating rate caused by a good thermal conductor, like bead and/or tread wire.

Time to exhaustive pyrolysis starts with the evolution of pyrolytic products and ends with the substancial exhaustion of condensible pyrolytic products. An end point based on noncondensibles is not practical. These are relative definitions to some control or standard. While theoretically imperfect this definition and other similar definitions may still provide a practical working standard of comparison.

The pyrolytic process can also be described in terms of an alternative heat flux. Therefore, in one embodiment the feed material is heated at an initial heat flux per average area loading of feed material of less than about 3.0 kW·m$^2$/kg$^2$, in an alternative embodiment from about 7.0×10$^{-4}$ kW·m$^2$/K$^2$ to about 3.0 kW·m$^2$/kg$^2$, in alternative embodiment from about 0.001 kW·m$^2$/kg$^2$ to about 1.5 kW·m$^2$/kg$^2$, and in yet an alternative embodiment from about 0.005 kW·m$^2$/kg$^2$ to about 0.5 kW·m$^2$/kg$^2$.

The pyrolytic process described above can be carried out at atmospheric pressure or at a low pressure, for example, less than about 550 kPa [about 80 psig], in alternative embodiment less than about 350 kPa [about 50 psig], and in yet alternative embodiments less than about 100 kPa [about 14.7 psig]. The pressure is due to internal generation of gasses and can vary as the pyrolitic reaction proceeds.

Time to exhaustive pyrolysis starts with the evolution of pyrolytic products and ends with the substancial exhaustion of condensible pyrolytic products. Exhaustive pyrolysis is attained when there is a sharp drop in the quantity of liquid product generated, and the vapor temperature usually coincides with a substantial temperature drop in temperature, for example, a temperature drop of at least about 56° C. [100° F.] within a time period of about 10 to 15 minutes, while maintaining a constant heat rate. In the example embodiment described above, the exhaustive pyrolysis is reached in about eight hours or less, in an alternative embodiment, about three hours or less, in an alternative embodiment from about 15 minutes to about two hours, and in an alternative embodiment from about 30 minutes to about 1.5 hours. The liquid portion of the product collected upon exhaustive pyrolysis contains at least about 5% greater number of organic carbon atoms present in aromatic rings compared to the number of organic carbon atoms present in aromatic rings of the feed material.

In another embodiment of the pyrolytic process, there is no added catalyst in the reactor. Residual catalyst, however, may be found in the feed material, such as for example, in thermoplastic polymers, thermoset polymers, and blends thereof.

In the various embodiments of the pyrolytic process described above, there is no added carrier gas or diluent gas present in the reactor. Carrier gases, such as, for example, helium, argon, nitrogen, carbon dioxide, may be present in the reactor, in the case where the reactor was purged prior to heating to reduce the amount of oxygen gas to just trace amounts, for example, less than about 1% oxygen by volume of the reactor. Residual carrier gas present in the reactor will be displaced from the reactor by the gaseous product stream that evolves during pyrolysis process.

In another embodiment the pyrolitic process further includes collecting a gaseous stream which evolves from the reactor and condensing the gaseous stream to obtain a liquid portion of the product. For example, the reactor can include a gas take-off stream that has a condenser, or other appropriate equipment that condenses the gaseous stream to a liquid stream. Additional equipment, for example, heat exchangers, instrumentation, catalytic performers, stripping and distillation columns and the like may be part of an integrated downstream process from the reactor. For example, the gaseous stream can be condenses by cooling the gaseous stream to about 80° C. or less, in an alternative embodiment to a temperature of less than about 30° C. or less. Furthermore, compounds generated from the gaseous stream, for example gases containing from one to four carbon atoms, can also be used as a heat source to fire the reactor.

The pyrolytic process according the embodiments described above can be conducted in a batch reactor or a continuous reactor. When the pyrolysis process take place within a continuous reactor such that the feed material is gradually conveyed along a reactor bed, the conveyed bed can be divided into a plurality of reactor units each treated as a separate entity as it moves along the reactor bed with each separate unit being within the reactor volume size as set forth above. For example, internal reactor volume ranges from about 1.7 cubic meters to about 113.27 cubic meters.

Ancillary heat transfer methods, such as, preheating, pre-drying, recirculation, etc, that are not easily obtained or perhaps not possible in a batch reactor can be utilized in a continuous process. It will be understood by one skilled in the art that the heat requirements of a continuous process will vary from section to section, i.e., more heat may be applied to the initial section which has the full loading of the feed material charged as compared to a latter section where a portion of the feed material has been pyrolyzed, thereby reducing the average area loading of feed material on the heated surface of the reactor. Similarly, in a batch reactor, although a constant rate of heat may be used, the heat flux to the charge will increase as pyrolysis occurs and the average area loading of feed material on the heated surface of the reactor decreases.

The formation of a the pyrolzate/char layer or bed, is due to the high heat applied to a surface of a vessel, essentially breaking down the feed material and yielding various pyrolysis products. The pyrolyzate bed depth that forms during a particular pyrolysis reaction will vary according to parameters such as heat rate, amount of charge utilized, type of material in charge, pressure, agitation, and the like. Generally, a char layer portion of the pyrozylate mass can have a thickness that is about 10 cm. [about 4 in.] or less, although it may be greater.

It has been observed that, for a given steady heating rate, the rate of pyrolysis, that is, the rate at which gaseous products are evolved, is usually not constant. Different rates of pyrolysis and/or types of products from within the pyrolysis vessel can occur. Above the initial activation temperature for a given pyrolytic system, various plateaus of production rate and product temperature have been observed.

Generally, the present invention tends to produce higher amounts of unsaturated organic compounds such as cycloalkenes and aromatic compounds, when compared to conventional pyrolytic processes. The end products, in the form of solid, liquid and gas, can be used for common and conventional applications. For example, the char from the process is suitable for use with coal as a boiler fuel, and a considerable portion of the condensable liquids can be used as petrochemical feedstocks.

FIG. 1 is a schematic illustration of a reactor apparatus for carrying out the pyrolytic process according to an example embodiment of the present invention. Feed hopper 10 which feeds polymer scrap to a incline conveyor 12 which at its upper end feeds the scrap into an auger feed 14 from where it is fed into a rotary dryer 16 having a flue gas exit pipe 18. An auger/air lock 20 feeds a multi stage double walled vessel shown generally at 22. The vessel 22 includes an upper inner walled vessel 24 and an upper outer walled vessel 26. There is upper vertical connecting tube 28 between the upper inner walled vessel 24 and a lower inner walled vessel 30. The lower inner walled vessel 30 is surrounded by a lower outer walled vessel 32 a lower discharge tube 34 extends from the lower inner walled vessel through the lower outer walled vessel to a horizontal discharge tube with air lock 36 which discharges char 38. A line 40 extends from the upper inner walled vessel 24 through the upper outer walled vessel to heat exchanger 42 and then to valve 44 to a liquid line 46 for product storage and a loop gas line 48 which extends to valve 50 on the lower outer walled vessel 32. Line 52 extends from the upper inner walled vessel 24 through the upper outer walled vessel 26 to heat exchanger 54. Line 56 extends from lower inner walled vessel 30 through lower outer walled vessel 32 to heat exchanger 58 lines 52 and 56 extend respectively from heat exchangers 54 and 58 to a valve 60 which diverts the stream to liquid line 62 which extends to product storage. Loop gas line 64 which extends back to valve 50 to inject gas into burner 51 which leads to the space between the lower outer walled vessel 32 and the lower inner walled vessel 30. This hot-burned flue gas continues to flow upwardly between the upper inner walled vessel 24 and the upper outer walled vessel 26 and then past the auger air lock 20 so as to heat the material flowing downwardly through the auger air lock 20. The hot flue gas then flows through 16 then out 18, preheating the incoming material.

The present invention will be better understood by reference to the following examples.

EXAMPLES

Description of Reactors and Heat sources:
Reactor I was a 60.96 cm by 5.08 cm diameter [24 in. by 2 in. diameter] SCH 40, 304 stainless steel pipe which was capped at the ends. The reactor was heated with a propane burner having a flame temperature of approximately 982° C. [1,800° F.] with a burner size of approximately 60.96 cm long and 5.08 cm wide [24 in. long and 2 in. width]. The reactor was constructed of two pipe sections connected to a central "tee" which provided a connection for the pyrozylate gases to the condenser. The reactor contained 0.455 kg [1 lb] of the feed material and was heated at the rate of 26.42 kW/kg [41,000 BTU per pound per hour].

Reactor II was a 91.44 cm by 10.16 cm diameter [36 in. by 4 in. diameter] SCH 40, 304 stainless steel pipe containing two 150 # flanges on the ends thereof covered by 150 # blind flanges. A 5.08 cm [2 in.] side arm was welded to the center of the 10.16 cm [4 in.] pipe to provide a connection for pyrozylate gases to the condenser. The reactor contained 4.545 kg [10 lb] of the feed material which was heated with the same burner as Reactor I, resulting in a heating rate of 2.642 kW/kg [4,100 BTU per pound of feed material per hour].

Reactor III was a 1514 liter [400 gallon] 304 stainless steel reactor having spherical heads with a 1.22 m [4 foot] diameter section of 1.22 m [4 foot] radius sphere and 0.9525 cm [⅜ in.] thickness. The shell of the reactor was 0.635 cm by 1.22 m in length by 1.22 m in diameter [¼ in. by 4 foot in length by 4 foot in diameter]. This reactor was heated with a propane heat source of about 117.15 kW [400,000 BTU per hour] at a temperature of approximately 982° C. [1,800° F.].

Standard conventional equipment such as a heat exchanger (condenser), surge tank and pressure regulator for escaping gas, were attached to the reactors to extract and collect the products. The internal pressure during the pyrolysis reactions were low, generally of the range of 0 to about 35 kPa [0 to about 5 psig].

All reactors were purged three times prior to the pyrolysis by pressurizing to about 100 kPa [15 psig] with $CO_2$ and then venting to atmospheric pressure.

Pyrolysis of Polyisoprene/Polystyrene Blends

A 50/50 (by weight) blend of cis-polyisoprene (Goodyear Natsyn® rubber), containing 96+% (by weight) of synthetic cis-1,4-polyisoprene, and beads of polystyrene commercial grade clear were added to the various reactors.

Summary of Observations from Examples 1-4
Induction Time to Pyrolysis and Duration of Pyrolysis

| | | Feed Material | | Time, minutes | | |
|---|---|---|---|---|---|---|
| EX..# | Reactor | kg | lb | To Initial Liq. Prod'n | End of Pyrolysis[1] | Total Heating |
| 1 | I | PI/PS | 0.455 | 1 | 13 | 17 | 30 |
| 2 | II | PI/PS | 4.545 | 10 | 30 | 80 | 110 |
| 3 | III | PI/PS | 45.45 | 100 | 21 | 99 | 120 |
| 4 | III | PI/PS | 454.5 | 1000 | 27 | 343 | 370 |

[1] End of pyrolysis is defined as time during constant application of heat at which vapor temperature drops ~56° C. [100° F.] or more in 10 min., and/or liquid production slows appreciably.

Example 1

Reactor I was charged with 0.455 kg [1 lb] of the above blend. The total heating time to exhaustive pyrolysis was 30 minutes.

Example 2

Reactor II was charged with 4.545 kg [10 lb] of the above blend. The total heating time to exhaustive pyrolysis was 1 hour and 55 minutes.

Example 3

Reactor III was charged with 45.455 kg [100 lb] of the above blend resulting in a heating rate of 2.58 kW/kg [4,000 BTU per pound feed material per hour]. The total heating time to exhaustive pyrolysis was 2 hours.

Example 4

Reactor III was charged with 454.54 kg [1,000 lb] of the above blend yielding a heating rate of 0.258 kW/kg [400 BTU per pound feed material per hour]. After approximately 6 hours and 10 minutes exhaustive pyrolysis was reached.

Table I sets forth the compounds found in the liquid products yielded by each of the Experiments. Experiments 1, 2, 3 and 4 relate as controls to each other showing how pyrolysis and its products varied as the parameters of size and heat rate were changed. The amount of aromatics produced shows a significant increase in applicant's process relative to that of the prior art. Experiment 3 is believed to show conditions at or near a peak production of aromatics.

It is apparent from Table I that several unexpected increases or decreases of various components of the liquid product were obtained as well as differing amounts of total aromatic compounds which are not suggested by the prior art. For example, the amount of toluene ranged from about 4.1 to about 7.6 percent by weight, the amount of ethyl benzene ranged from about 3.2 to 18.8 percent, the amount of (1-methylethenyl)benzene, [a-methylstyrene], ranged from about 3.8 to 7.7 percent, the amount of styrene ranged from about 33.2 to 60.2 percent, and the amount of 1-methyl-4-(1-methyl-ethenyl)-cyclohexene [limonene] ranged from about 11.2 to about 21.5 percent.

TABLE I

Polyisoprene-Polystyrene Pyrolysis

| | EXPERIMENT | | | |
|---|---|---|---|---|
| | 1 | 2 | 3 | 4 |
| Compound | Percent of Pyrozylate by Weight | | | |
| 2-butene | 0.2 | 0.1 | 0.5 | 0.5 |
| 3-methyl-1-butene | 0.1 | 0.1 | 0.1 | 0.2 |
| 2-pentene | 0.1 | 0.2 | 0.4 | 0.5 |
| 2-methyl-1,3-butadiene | 4.4 | 3.2 | 4.2 | 4.4 |
| (1-methylethenyl) cyclopropane | 0.1 | 0.1 | 0.2 | 0.2 |
| 1-methyl-1,3-cyclopentadiene | 0.1 | 0.1 | 0.2 | 0.1 |
| 1,5-dimethylcyclopentene | 0.2 | 0.1 | 0.2 | 0.1 |
| 2-methyl-1,3-pentadiene | 0.2 | 0.2 | 0.5 | 0.4 |
| 3-methyl-1,3,5-hexatriene | 0.2 | 0.2 | 0.3 | 0.2 |
| 3-methyl-2,4,-hexadiene | 0.5 | 0.5 | 0.4 | 0.6 |
| 2,4,4-trimethyl-2-pentene | 0.1 | 0.1 | 0.1 | 0.1 |
| Toluene | 4.1 | 5.1 | 5.6 | 7.6 |
| 1,2-dimethylcyclohexane | 0.2 | 0.2 | 0.1 | 0.2 |
| 2,3-dimethyl-1,4-hexadiene | 0.2 | 0.2 | 0.3 | 0.3 |
| $C_8H_{12}$ unsaturated aromatic | 0.1 | 0.1 | 0.1 | 0.1 |
| Ethyl Benzene | 3.2 | 6.3 | 3.2 | 18.8 |
| $C_9H_{14}$ unsaturated aromatic | 0.5 | 0.1 | 0.2 | 0.1 |
| (1-methylethyl) benzene | 0.3 | 0.7 | 0.6 | 4.9 |
| $C_{10}H_{16}$ unsaturated aromatic | 0.2 | 0.2 | 0.1 | 0.1 |
| Styrene | 54.6 | 51.0 | 60.2 | 33.2 |
| 1,2-dimethyl benzene | 0.3 | 0.3 | 0.9 | 0.2 |
| $C_{10}H_{16}$ unsaturated aromatic | 0.3 | 0.3 | 0.2 | 0.2 |
| Propyl Benzene | 0.4 | 0.6 | 0.7 | 0.4 |
| (1-methlyethenyl) benzene | 4.3 | 7.1 | 3.8 | 7.7 |
| 1-methyl-5-(1-methylethenyl)-cyclohexene | 4.0 | 0.3 | 0.5 | 0.4 |
| 4-methyl-1-(1-methylethenyl)-cyclohexene | 0.5 | 0.2 | 0.1 | 0.1 |
| 1-methly-4-(1-methylethenyl)-cyclohexene | 21.5 | 19.0 | 11.2 | 14.1 |
| 3,7,7-trimethylbicyclo [4.1.0]-hept-2-ene | 0.3 | 0.4 | 0.1 | 0.6 |
| 1-methyl-4-(1-methylethyl)-cyclohexene | 0.7 | 0.6 | 0.7 | 0.5 |

TABLE I-continued

Polyisoprene-Polystyrene Pyrolysis

| | EXPERIMENT | | | |
|---|---|---|---|---|
| | 1 | 2 | 3 | 4 |
| Compound | Percent of Pyrozylate by Weight | | | |
| 2,3,6-trimethyl-1,5-heptadiene | 0.3 | 0.3 | 0.4 | 0.5 |
| 1-ethyl-2-methyl-benzene | 0.5 | 0.7 | 1.2 | 0.8 |
| 1-ethyl-3-methyl-benzene | 0.1 | 0.1 | 0.4 | 0.1 |
| 2-ethyl-1,3-dimethyl-benzene | 0.3 | 0.3 | 0.3 | 0.2 |
| 1-pentenyl-benzene | 0.5 | 0.3 | 0.7 | 0.6 |
| 1,2,3-trimethyl-benzene | 0.1 | 0.1 | 0.2 | 0.1 |

It was unexpected that significant amounts of (1-methylethenyl)-cyclopropane, 1-methyl-1,3-cyclopentadiene, 1,5-dimethylcyclopentene, 2-methyl-1,3-pentadiene, 1,2-dimethylcyclohexane, and, most unusually, 3,7,7-trimethyl-bicyclo-[4.1.0]-hept-2-ene were produced. Also present were 3-methyl-2,4-hexadiene, 2,3-dimethyl-1,4-hexadiene, 2,3,6-trimethyl-1,5-heptadiene and 3-methyl-1,3,5-hexatriene (a cumlene); all were present in all samples. These dienes and trienes are the apparent precursors of many of the aromatic(s).

As a whole, large reductions or increases occurred in various compounds as compared to previous pyrolytic methods. In particular, the recovery of a high percentage of the feed material as aromatic compounds in the liquid product differs from the prior art.

The data shown in Table III-A was obtained in the following ways: pyrosylate liquid and char are reported as weight of recovered material divided by feed material weight. Gas, as stated, is a mass/material balance calculated by difference.

TABLE III-A

Polyisoprene-Polystyrene Pyrolysis

| | EXAMPLE | | | |
|---|---|---|---|---|
| | 1 | 2 | 3 | 4 |
| Feed Material wt., kg [lb] | 0.454 [1] | 4.545 [10] | 45.45 [100] | 454.5 [1000] |
| Pyrosylate Liquid by direct wt. | 91% | 95.8% | 92.0% | 94.625% |
| Char by direct wt. | 1% | 1.1% | 1.7% | 3.700% |
| Gas by difference | 8% | 3.1% | 6.3% | 1.675% |

One can compare the recovery of Styrene in Examples 1-4 with the styrene present in the feed material. If all of the polystyrene in the feed material reverted to styrene in the liquid product recovered from the pyrolysis, then the weight of recovered styrene should equal the weight of polystyrene charged in the feed material. This calculation is illustrated below with respect to Example 1.

Wt. % liquid product=91% (see Table III-A)

Wt. % Styrene in liquid product=54.6% (See Table I)

Wt. % Styrene recovered=91%×54.6%=49.686%

Wt % Styrene expected from polystyrene in feed material=50%

Data for Examples 1-4 are given below in Table IV

TABLE IV

Styrene Output Polyisoprene-Polystyrene Pyrolysis
Styrene treated as a separate species

| | EXAMPLE | | | |
|---|---|---|---|---|
| | 1 | 2 | 3 | 4 |
| Polystyrene in Reactor Feed material, kg [lb] | 0.227 kg [0.5 lb] | 2.273 kg [5.0 lb] | 22.727 kg [50.0 lb] | 227.27 kg [500.0 lb] |
| Styrene in Product, Wt. % | 49.686% | 48.858% | 55.384% | 31.455% |
| Difference from Complete Stryene Recovery, Wt. % | −0.3140% | −1.1420% | 5.3840% | −18.55% |

Example 3 shows more styrene out than in, demonstrating conversion of isoprene. This teaches away from known art.

The increase of aromatics from these experiments can be calculated by summing the weight of the aromatic compounds detected in the recovered liquid product, multiplying by the weight percent liquid recovered and dividing by the know weight of the aromatic portion of the feed material, i.e., polystyrene. For illustration, the calculation for Experiment 1 is shown below:

Initial Feed Material=0.454 kg [1 lb]

Liquid product, wt. % of initial Feed Material=91%

0.454 kg×0.91=0.413 kg [0.91 lb]

Weight % Aromatics in Liquid Product (sum of yields from Table I)=69.7%

Weight Aromatics in Liquid Product 0.413 kg×0.697=0.288 kg [0.6344 lb]

Increase In Aromatics=Weight Aromatics in Liquid Product−Weight of Aromatic in feed material (i.e. polystyrene)

0.288 kg−0.227 kg=0.061 kg [0.13427 lb]

% Increase in Aromatics=Weight increase/Weight of Initial 0.061 kg/0.227 kg=13.4%

Results of this analysis for Examples 1-4 are given in Table V below.

When the total aromatic content of the liquid product is considered, Examples 1-4 all indicated greater weight percent aromatic materials in the liquid product than in the polystyrene of the feed material. The balance of the liquid product consisted of non-aromatic compounds.

TABLE V

Total Output from Polyisoprene-Polystyrene Pyrolysis
Weight Percent Aromatics in Liquid Product

| | EXAMPLE | | | |
|---|---|---|---|---|
| | 1 | 2 | 3 | 4 |
| Aromatics in Pyrosylate (from Table I) | 69.7% | 73.1% | 78.3% | 74.8% |
| Total Aromatics Recovered, Wt. % | 63.4% | 70.0% | 72.0% | 70.8% |
| Wt. % Aromatics Created | 13.4% | 20.0% | 22.04% | 20.78% |

A further method of demonstrating the invention is to consider only the creation of aromatic rings from non-aromatic carbons in the feed material. This distinguishes the invention from prior art which may increase the weight percent of aromatic compounds in the pyrozylate product by alkylation of the aromatic rings present in the feed material. An illustration of a method to perform this accounting is given below for Toluene recovered in Example 1.

Wt. Liquid Product=0.455 kg×0.91=0.4136 kg [0.91 lb]

Wt. % Toluene in Liquid Product=4.31%

Wt. Toluene in Liquid Product=0.413 kg×0.0431=0.01696 kg [0.03731 lb]

Kg Mole of recovered Toluene=Wt. Toluene/Mol. Wt. Toluene=0.01696 kg/92 g/mol=1.843×10$^{-4}$ kg mol [4.055×10$^{-4}$ lb mol]

Benzene molar equivalent of toluene in liquid product=1.843×10$^{-4}$ kg mol×Mol wt Benzene=1.843×10$^{-4}$ kg mol×78=0.01438 kg [0.0316324 lb] benzene molar equivalent Sample Calculations for Toluene molecular weight 92
Polyisoprene/polystyrene Pyrolysis

| | EXAMPLE | | | |
|---|---|---|---|---|
| | 1 | 2 | 3 | 4 |
| Total Feed Material, kg [lb] | 0.455 [1 lb] | 4.545. [10 lb] | 45.455 [100 lb] | 454.55 [1000 lb] |
| A - Wt. Liquid, kg [lb] | 0.413 [0.91] | 4.345 [9.58] | 41.818 [92.0] | 431.12 [946.25] |
| B - Toluene % (From Table I) | 4.1 | 5.1 | 5.6 | 7.6 |
| E - Benzene Molar Equivalent wt., kg [lb] | 0.01438 [0.0316324] | 0.1883 [0.41423] | 1.985 [4.3648] | 27.71 [60.9714] |

Similar calculations were carried out for each aromatic species (see Table II) and the sum result is reported as the Benzene Molar Equivalent. Alternatively, the sum of all E is the Benzene Molar Equivalent. An expectation Benzene Molar Equivalent value can be calculated for Example 1 which contains 0.2272 kg of polystyrene:

0.2272 kg polystyrene/104 g/mol=2.185×10$^{-3}$ kmol styrene

[4.808×10$^{-3}$ lb mol styrene]

2.185×10$^{-3}$ kmol styrene×78 g/mol Benzene=0.1704 kg [0.375 lb]

Benzene Molar Equivalent

The Increase of Aromatic Rings Bz.Eq. is simply the percent increase between the expectation value and the actual test value; e.g., in Example 1:

100%×(0.47202÷0.375−1)=25.872% increase.

TABLE VI

Benzene Equivalency Chart

| | EXAMPLE | | | |
|---|---|---|---|---|
| | 1 | 2 | 3 | 4 |
| Styrene input, kg [lb] | 0.227 kg [0.5 lb] | 2.273 kg [5.0 lb] | 22.727 kg [50.0 lb] | 227.27 kg [500.0 lb] |
| Benzene Molar Equivalent expect. Value, kg [lb] | 0.1704 [.375] | 1.704 [3.75] | 17.04 [37.50] | 170.4 [375.0] |
| Benzene Molar Equivalent test value, kg [lb] | 0.2146 [0.47202] | 2.432 [5.3512] | 24.404 [53.6888] | 237.639 [522.8058] |
| Increase of Aromatic Rings Bz. Eq. by wt. % | 25.872% | 42.699% | 43.170% | 39.415% |

The increase in the weight of aromatic species is not due, in general, to the alkylation of existing aromatic rings, but rather to an increase in the number of aromatic rings. Some Alkylation/Rearrangement/Disruption of the preexisting aromatic rings surely occurs; however, it is undeniable that a gross feature of the invention is that new aromatic rings are forming using isoprene as a starting material. The percent increase of aromatic rings is substantial, up to 43% by weight, which definitely exceeds the values reported in the known art. It is the large increase in the number of aromatic rings, not the alkylation of existing rings, that teaches very far indeed, away from the known art.

Pyrolysis of Scrap Tires

Various amounts of scrap tires as set forth in Table VIII were added to the various reactors. The reactor size, heating temperatures, input rate of heat, initial purge with $CO_2$ and the like are the same as set forth above with regard to Reactors I-III. Reactors in Examples 5-8 were charged with shredded tires which did not contain either bead fabric wire. Reactor III in Example 9 was charged with whole scrap tires. The fill port of the reactor limited the tires to those of less than 14 inch rim size. Experimental observations are summarized in Table VIII.

TABLE VIII

Summary of Data from Examples 5-9
Induction Time to Pyrolysis and Duration of Pyrolysis

| EX. # | Reactor | Feed material | kg | lb | To Initial Liq. Prod'n | End of Pyrolysis[1] | Total Heating |
|---|---|---|---|---|---|---|---|
| 5 | I | Tire Chip[2] | 0.455 | 1 | 12 | 14 | 26 |
| 6 | II | Tire Chip[2] | 4.545 | 10 | 38 | 67 | 105 |
| 7 | III | Tire Chip[2] | 45.455 | 100 | 35 | 115 | 150 |
| 8 | III | Tire Chip[2] | 454.5 | 1000 | 80 | >>520[4] | >>600[4] |
| 9 | III | Tire, Whole[3] | 136.4 | 300 | NM | NM | ~150-200 |

NM = Not Measured
[1]End of pyrolysis is defined as time at which vapor temperature drops ~100 deg F. in 10 min., and/or liquid production slows appreciably.
[2]Shredded tires without either bead or belt wire. Average size ~2 cm.
[3]Whole 13 and 14 inch tires with intact bead and belt wire.
[4]Pyrolysis was not taken to End of Pyrolysis due to excessive time of experiment Example 9 was performed as ranging test prior to running Examples 8 to estimate the quantity of propane which would be required for the 454.5 kg test. Reactor III was charged with 136.36 kg [300 1bs] of whole tires, which included bead and belt wire, was pyrolized. The heating rate was 0.86 kW/kg [1333 BTU/lb·hr]. The test proceeded with unexpected speed, approximately 2 hours. No data was collected on time to first liquid product, time to end of pyrolysis or composition of liquid.

Later, the 454.5 kg [1000 lb] test on tires was run, using the wire free shredded tire feed material. Exhaustive pyrolysis could not be reached in a reasonable time i.e. greater than 10 hrs. The test ended due to fuel depletion, even though 5 to 10 cc/min of liquid product was being produced. The recovered pyrozylate mass, 324.77 kg [714.5 lbs], was in an onion like layered condition consisting of an outer carbonized shell of 103.64 kg [228 lbs], an intermediate fused, asphalt-like layer of 58.41 kg [128.5 lbs], and an inner core of 143.18 kg [315 lbs], that had been encapsulated by the asphalt layer. The maximum temperature experienced in the core was so moderate that the tire cord did not unworst (untwist). The failure to conduct heat into the core of the 454.5 kg [1000 lbs] of shredded tire feed material, which was free of bead or belt wire, and was unexpected as was the complete encapsulation of the mass's center.

TABLE II

Tire Pyrolysis

| | EXAMPLE | | |
|---|---|---|---|
| | 5 | 6 | 7 |
| Compound | Percent of Pyrozylate by Weight | | |
| Ethyl benzene | 5.9 | 10.0 | 10.0 |
| Benzonitrile | 1.4 | 2.8 | 2.0 |
| (1-methylethenyl) benzene | 2.5 | 1.0 | 2.9 |
| Styrene | 10.1 | 5.1 | 6.3 |
| Xylenes | 1.6 | 2.0 | 4.3 |
| Propyl benzene | 1.2 | 1.6 | 1.4 |
| Ethylmethyl benzene | 2.0 | 3.7 | 4.2 |
| Trimethyl benzene | 1.9 | 2.1 | 3.4 |
| 2-ethyl-1,3-dimethyl benzene | 0.9 | 1.5 | 1.3 |
| Benzene | 5.9 | 6.5 | 6.7 |
| Toluene | 11.1 | 14.3 | 13.5 |
| 4-Methyl-1-Pentene | 0.8 | 0 | 0 |
| 1-Butene | 1.9 | 0.3 | 0.3 |
| 3-Methyl-1-Butene | 0.8 | 0 | 0 |
| 2-Pentene | 1.1 | 0.6 | 0.7 |
| Cyclopentene | 0.4 | 0.4 | 0.5 |
| 3-Methyl-1,3-Butadiene | 3.8 | 1.8 | 1.6 |
| 3,3 Dimethyl Cyclobutene | 0.9 | 0.9 | 1.0 |
| 1,3-Butadiene | 0.4 | 0 | 0 |
| Cyclohexene | 1.1 | 0 | 0 |
| 4-Methyl Cyclopentene | 1.3 | 1.2 | 1.6 |
| 3-Methyl-2,4-Hexadiene | 0.6 | 1.2 | 1.1 |
| 1,3,5-Hexatriene | 0 | 0.3 | 0.4 |
| 1,4-Cyclohexadiene | 0.4 | 0 | 0 |
| 1,2-Dimethylcyclohexane | 0.5 | 0.5 | 0.5 |
| 3,3-Dimethyl-1-Butene | 1.1 | 0 | 1.2 |
| 2,4-Hexadiene-1-OL | 0.7 | 0.8 | 0.8 |
| 5-Methyl-1,4-Hexadiene | 1.2 | 1.3 | 1.1 |
| 3-Pentene-2-one | 1.1 | 0 | 0 |
| 3,4,4-Trimethyl-2-Pentene | 0 | 1.0 | 1.2 |
| Formic Acid Heptylester | 1.4 | 0 | 0 |
| Heptane | 0.6 | 0.9 | 0.8 |
| 2-Methyl-1,4-Hexadiene | 1.5 | 0 | 0 |
| 2-Chloro-2-Methyl Propane | 1.1 | 1.0 | 1.2 |
| 4-Ethenylcyclohexene | 3.0 | 2.6 | 2.6 |
| Ethenylcyclohexene | 0.6 | 0.6 | 0.5 |
| 1-Chlorohexane | 0.5 | 0 | 0 |
| 2-Octene | 0 | 0 | 0.4 |
| 1-Octene | 0.5 | 0 | 0 |
| 1-Methyl-4-(1-Methylethenyl) Cyclohexene | 15.9 | 15.0 | 7.7 |
| 1-Butyl-2-Ethylcyclopropane | 0.6 | 0.9 | 0.5 |
| 1,7,7-Trimethylbicyclo[2.2.1]-Hept-2-ene | 3.3 | 4.2 | 0 |
| 2,3,6-Trimethyl-1,5-Heptadiene | 1.2 | 1.7 | 1.3 |
| 1,2,3-Trimethylcyclopropane | 0.7 | 0 | 0 |
| 3-Chloro-1-Propynl-Cyclohexane | 0.4 | 0 | 0 |
| 2,2,4-Trimethyl-3-Pentene-1-ol | 0.9 | 1.1 | 0 |
| 2-Dimethylcyclohexene | 1.1 | 1.4 | 1.3 |
| 2,4,4-Trimethyl-1-Pentene | 0.6 | 0.5 | 0.3 |

As indicated by Table II, the pyrolysis of scrap rubbers yielded a significant amount of aromatic compounds. Inasmuch as scrapped tires constitute a major waste product of the United States, the present invention has great potential in reducing the stock piling of such tires and turning them into a useful resource.

Since the exact composition of the tire feed material was not know, i.e., the aromatic vs. non-aromatic ratio of the feed material was not know, the production of aromatic materials by the process of the invention was compared with a well know prior art example. U.S. Bureau of Mines investigation #7302 reports tire pyrolysis yields averaging 128.3 liters [33.9 gallons] of aromatics per ton (see page 10, Heavy Oils). Assume a density of 0.9 for the aromatic oil, a generous figure. Then, 0.9 times 8 lb/gal equals 7.2 lb/gal times 33.9 gal/ton equals 244.08 lb/ton aromatics. 244.08 divided by 2000 equals 12.2%, average aromatic yield by weight.

Calculations similar to those discussed above (see Table V) were performed for the values measured for Examples 5, 6 and 7 (See Table III-B). A comparison of these results showing the total yield of aromatic compounds are reported in Table III-C along with the value calculated above for the Bureau of Mines study. Yields for the Examples of this invention are approximately double that achieved in the Bureau of Mines study.

TABLE III-B

| | Tire Pyrolysis | | | |
|---|---|---|---|---|
| | EXAMPLE | | | |
| | 5 | 6 | 7 | 8 |
| Feed Material, kg | 0.454 | 4.545 | 45.45 | 454.5 |
| [lb] | [1] | [10] | [100] | [1000] |
| Pyrosylate Liquid by direct wt. | 46% | 38.6% | 41.5% | NA |
| Char by direct wt. | 38% | 50.6% | 44.5% | NA |
| Gas by difference | 16% | 10.8% | 14.0% | NA |
| Aromatics in Pyrosylate (Table II) | 43.0% | 52.5% | 56.0% | NA |

TABLE III-C

| | EXAMPLE | | | US Bureau |
|---|---|---|---|---|
| | 5 | 6 | 7 | Of Mines |
| % Aromatics by wt. | 19.78% | 20.27% | 23.24% | 12.2% |

It will be appreciated that a process for pyrolyzing hydrocarbons and particularly plastic or rubber scrap has been described in which there are an increased amount of aromatics in the output material as compared to the input materials. It should also be appreciated that the process has been described for pyrolyzing polymer feed stock which a large variety of polymers including rubbers, such as automobile fluff and tires and plastics including computer casings, diskettes and circuit boards as well as paints, inks, adhesives and limited amounts of poly vinyl chloride may be included in the feed stock. Accordingly a robust process is availed so that expensive feed stock handling and pre sorting operations may be eliminated or minimized.

While the present invention has been described in connection with the preferred embodiments of the various figure, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended

TABLE VII

| | | Heating/Firing Rate Data For Polystyrene-Polyisoprene and Tires | | | | |
|---|---|---|---|---|---|---|
| | | EXAMPLE | | | | |
| | | 1, 5 | 2, 4 | 3, 5 | 9 | 6, 8 |
| A | Firing Rate, kW | 12.01 | 12.01 | 117.15 | 117.15 | 117.15 |
| | BTU/hr | 41,000 | 41,000 | 400,000 | 400,000 | 400,000 |
| B | Polymer Feed Material, kg | 0.455 | 4.545 | 45.455 | 136.364 | 454.545 |
| | lb | 1 | 10 | 100 | 300 | 1000 |
| C | Reactor Weight, kg | 4.55 | 45.45 | 681.80 | 681.80 | 681.80 |
| | lb | 10 | 100 | 1500 | 1500 | 1500 |
| D | kW/$kg_{load}$ | 26.42 | 2.64 | 2.58 | 0.86 | 0.26 |
| | BTU/$lb_{load}$ · hr | 41000 | 4100 | 4000 | 1333 | 400 |
| E | kW/$kg_{total}$ | 2.399 | 0.240 | 0.161 | 0.143 | 0.103 |
| | BTU/$lb_{total}$ · hr | 3727 | 373 | 250 | 222 | 160 |
| F | Heated Area, $m^2$ | 0.05 | 0.15 | 1.21 | 1.21 | 1.21 |
| | $ft^2$ | 0.52 | 1.57 | 13.00 | 13.00 | 13.00 |
| G | Polymer Load, kg/$m^2$ | 9.34 | 31.15 | 37.64 | 112.91 | 375.66 |
| | lb/$ft^2$ | 1.91 | 6.37 | 7.69 | 23.08 | 76.92 |
| H | kW · $m^2$/$kg^2$ | 2.82709 | 0.08481 | 0.06848 | 0.00761 | 0.00069 |
| | (BTU/$lb_{load}$ · hr)/($lb_{load}$/$ft^2$) | 21467.55 | 644.03 | 520.00 | 57.78 | 5.20 |
| I | (kW/$kg_{total}$)/($kg_{load}$/$m^2$) | 0.25678 | 0.00771 | 0.00428 | 0.00127 | 0.00027 |
| | (BTU/$lb_{total}$ · hr)/($lb_{load}$/$ft^2$) | 1951.595 | 58.548 | 32.500 | 9.630 | 2.080 |
| J | Heat Flux kW/$m^2$ | 246.85 | 82.28 | 97.00 | 97.00 | 96.82 |
| | BTU/$ft^2$ · hr | 78304 | 26101 | 30769 | 30769 | 30769 |

D = A/B

E = A/(B + C)

G = B/F

H = D/G

I = E/G

J = D · G

What is claimed is:

1. A process for pyrolyzing hydrocarbonaceous material, the process comprising the steps of:
charging a reactor having a volume of at least 1.7 cubic meters with feed material, the feed material comprising carbonaceous material;
heating the feed material at an initial heat flux rate that ranges from about $7\times10^{-4}$ kW·m$^2$/kg$^2$ to about 3.0 kW·m$^2$/kg;
collecting liquid product from the reactor; and
wherein the reactor is substantially anaerobic in operation.

2. The pyrolytic process of claim 1, wherein at least about 5% of the organic carbon atoms which are not present in an aromatic ring of a compound of the feed material are present in an aromatic ring of a compound in a liquid portion of the product.

3. The pyrolytic process of claim 1, wherein at least about 40% of the organic carbon atoms of the feed material are carbon atoms not present in aromatic rings.

4. The pyrolytic process of claim 1, wherein the feed material is heated at a heat input rate that ranges from about 0.25 kW/kg to about 27 kW/kg.

5. The pyrolytic process of claim 1, wherein the heat rate to the reactor ranges from about 0.3 kW/kg to about 25 kW/kg.

6. The pyrolytic process of claim 1, wherein the average area loading of the feed material on the heated surface of the reactor upon initial heating, ranges from about 9.0 kg/m$^2$ to about 400 kg/m$^2$.

7. The pyrolytic process of claim 1, wherein the average area loading of the feed material in the reactor upon initial heating ranges from about 20 kg/m$^2$ to about 300 kg/m$^2$.

8. The pyrolytic process of claim 1, wherein the reactor has at least about 25% free volume upon initial heating.

9. The pyrolytic process of claim 1, wherein there is no added catalyst in the reactor.

10. The pyrolytic process of claim 1, wherein there is no added carrier gas present in the reactor.

11. The pyrolytic process of claim 1, wherein the time period for heating is about three hours or less.

12. The pyrolytic process of claim 1, wherein the hydrocarbonaceous material comprises compounds selected from the group consisting of: thermoplastic polymers, thermoset polymers and blends of thermoplastic polymers and thermoset polymers.

13. The pyrolytic process of claim 1, wherein the feed material comprises at least about 70% by weight hydrocarbonaceous material.

14. The pyrolytic process of claim 1, wherein the feed material comprises up to about 25% by weight metal.

15. The pyrolytic process of claim 1, further comprising the step of agitating the feed material during heating.

16. The pyrolytic process of claim 1, wherein the pyrolytic process is continuous.

17. The pyrolytic process of claim 16, wherein the reactor comprises a plurality of reactor units, each of the plurality of reactor units having an internal volume that ranges from about 1.7 cubic meters to about 114 cubic meters.

18. The pyrolytic process of claim 17, wherein a reactor unit of the plurality of reactor units contains the feed material and has at least about 40% free volume upon initial heating.

19. The pyrolytic process of claim 1, wherein the feed material has an average particle size of about 15 centimeters or less.

20. The pyrolytic process of claim 1, wherein the feed material comprises, by weight, from about 5% to about 95% thermoset polymer and from about 95% to about 5% thermoplastic polymer.

21. The pyrolytic process of claim 1, wherein the internal pressure of the reactor is less than about 550 kPa.

* * * * *